(12) United States Patent
Trickey et al.

(10) Patent No.: US 9,500,080 B2
(45) Date of Patent: Nov. 22, 2016

(54) METHOD OF REPLACING DAMAGED AEROFOIL

(71) Applicants: Rolls-Royce plc, London (GB); Rolls-Royce Corporation, Indianapolis, IN (US)

(72) Inventors: Philip S. Trickey, Nottingham (GB); John P. E. Forsdike, Worcestershire (GB); Peter E. Daum, Fishers, IN (US)

(73) Assignees: Rolls-Royce plc (GB); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 14/846,302

(22) Filed: Sep. 4, 2015

(65) Prior Publication Data

US 2016/0076376 A1      Mar. 17, 2016

Related U.S. Application Data

(60) Provisional application No. 62/050,799, filed on Sep. 16, 2014.

(51) Int. Cl.
*B23K 31/02* (2006.01)
*F01D 5/00* (2006.01)
(Continued)

(52) U.S. Cl.
CPC ........... *F01D 5/005* (2013.01); *B23K 20/1205* (2013.01); *B23K 20/126* (2013.01);
(Continued)

(58) Field of Classification Search
CPC .......... B23K 1/0018; B23K 2201/001; B23K 20/12–20/1295; B23K 26/00–26/707; B23K 10/00–10/027; B23P 15/006; B23P 6/002; F01D 5/005; F01D 5/12; F01D 2230/80; F01D 5/34; F01D 5/3061; F05D 2220/32; F05D 2240/30; F05D 2230/80; F05D 2230/239

USPC ........... 228/112.1–114.5, 2.1–2.3, 119, 175; 29/889.1–889.722; 219/121.6–121.86, 219/121.36–121.59
See application file for complete search history.

(56) References Cited

U.S. PATENT DOCUMENTS

| 4,822,248 A | * | 4/1989 | Wertz | ...................... B23P 6/007 29/402.07 |
| 4,934,583 A | * | 6/1990 | Patsfall | ................... B23K 20/00 228/119 |

(Continued)

FOREIGN PATENT DOCUMENTS

| EP | 0669183 | 8/1995 | |
| EP | 0841470 A2 | * 5/1998 | .............. B23P 6/005 |

(Continued)

OTHER PUBLICATIONS

European Search Report for EP15181599, completed Jan. 14, 2016, (2 pages).

*Primary Examiner* — Kiley Stoner
(74) *Attorney, Agent, or Firm* — Barnes & Thornburg LLP

(57) ABSTRACT

A method is provided of replacing a damaged blade of an integrally bladed rotor assembly including a disc and a plurality of blades extending outwardly from a rim of the disc. The method includes the steps of: removing the damaged blade to leave a blade repair stub projecting from the rim; locating sacrificial supports at the underside of the rim beneath the repair stub, the supports projecting axially beyond the trailing and leading edges of the rim; depositing metal around the trailing and leading edges of the repair stub, the deposited metal, supported by the sacrificial supports, projecting axially beyond the trailing and leading edges of the rim; attaching a replacement blade to the repair stub by linear friction welding; and removing excess deposited metal, upset metal from the linear friction welding, and the sacrificial supports.

10 Claims, 3 Drawing Sheets

(51) Int. Cl.
  *F01D 5/12* (2006.01)
  *B23K 20/12* (2006.01)
  *B23P 6/00* (2006.01)
  *F01D 5/30* (2006.01)
  *F01D 5/34* (2006.01)
  *B23P 15/00* (2006.01)

(52) U.S. Cl.
  CPC ............... *B23P 6/002* (2013.01); *F01D 5/12* (2013.01); *F01D 5/3061* (2013.01); *F01D 5/34* (2013.01); *B23K 2201/001* (2013.01); *B23P 15/006* (2013.01); *F05D 2220/32* (2013.01); *F05D 2230/239* (2013.01); *F05D 2230/80* (2013.01); *F05D 2240/30* (2013.01)

(56) References Cited

U.S. PATENT DOCUMENTS

| | | | | |
|---|---|---|---|---|
| 5,197,190 A * | 3/1993 | Coolidge | ............... | B23P 6/005 228/119 |
| 5,865,364 A * | 2/1999 | Trask | ............... | B23K 20/1205 228/112.1 |
| 6,106,233 A * | 8/2000 | Walker | ............... | B23K 20/1205 228/112.1 |
| 6,326,585 B1 * | 12/2001 | Aleshin | ............... | B23K 26/032 219/121.63 |
| 6,478,545 B2 * | 11/2002 | Crall | ............... | B23K 20/129 29/889.1 |
| 6,542,843 B1 * | 4/2003 | Metzinger | ............... | B23P 6/002 702/113 |
| 2002/0127108 A1 * | 9/2002 | Crall | ............... | B23K 20/129 416/213 R |
| 2005/0118330 A1 * | 6/2005 | Clark | ............... | B23K 20/1205 427/140 |
| 2005/0274010 A1 | 12/2005 | Rawson et al. | | |
| 2006/0051211 A1 * | 3/2006 | Ferte | ............... | B23K 20/129 416/213 R |
| 2007/0007260 A1 * | 1/2007 | Steinhardt | ............... | B23K 6/007 219/121.64 |
| 2008/0148566 A1 * | 6/2008 | Bayer | ............... | B23K 20/023 29/889.1 |
| 2008/0244905 A1 * | 10/2008 | Meier | ............... | B23K 26/24 29/889.1 |
| 2009/0113708 A1 * | 5/2009 | Bamberg | ............... | B23K 20/1205 29/889.21 |
| 2009/0185908 A1 * | 7/2009 | Chung | ............... | B23K 20/1205 416/213 R |
| 2010/0135779 A1 * | 6/2010 | Stimper | ............... | F01D 5/005 415/208.1 |
| 2010/0284817 A1 * | 11/2010 | Bamberg | ............... | B23K 15/0046 416/241 R |
| 2012/0148413 A1 * | 6/2012 | Richter | ............... | B23P 6/005 416/223 R |
| 2012/0205348 A1 * | 8/2012 | Romanelli | ............... | B22F 3/105 219/121.14 |
| 2015/0107108 A1 * | 4/2015 | Lowth | ............... | F01D 5/005 29/889.1 |
| 2015/0322791 A1 * | 11/2015 | Flach | ............... | F01D 5/005 416/223 R |

FOREIGN PATENT DOCUMENTS

| | | |
|---|---|---|
| EP | 2339116 | 6/2011 |
| EP | 2444192 A2 * | 4/2012 |
| FR | 2998499 | 5/2014 |
| JP | 20120117720 | 1/2012 |
| WO | WO 0003834 A1 * | 1/2000 ............. B23K 13/01 |

* cited by examiner

METHOD OF REPLACING DAMAGED AEROFOIL

This application claims priority to and the benefit of U.S. Provisional Patent Application No. 62/050,799; filed 16 Sep. 2014, the disclosure of which is now incorporated herein by reference.

FIELD OF THE INVENTION

The present invention relates to a method of replacing a damaged blade of an integrally bladed rotor assembly, particularly for a gas turbine engine.

BACKGROUND OF THE INVENTION

Compressors and turbines of gas turbine engines such as those used in aero engines typically include a plurality of rotor and stator vane assemblies. The rotor assemblies are designed to impart work into gases passing through the compressor and extract work from the gases passing through the turbine. The stator vane assemblies help to direct the working gases entering or exiting the rotor assemblies and thereby increase efficiency of the engine.

Each rotor assembly includes a disc and a plurality of blades attached to the disc so as to extend radially outwardly therefrom. Conventionally, the blades are attached to the disc by mechanical connections such as "fir tree" type connections where a fir tree shaped blade root is received within a complementary shaped recess in the disc. This means that the blade can be readily replaced in the event that it is damaged.

Recent developments have resulted in integrally bladed rotor assemblies or "blisks" in which the blades are formed integrally with the disc. These have advantages of reduced weight as compared to a standard rotor assemblies and improved aerodynamic efficiency.

For example, blisks can be formed by joining the blades onto the rim of the disc at respective blade stubs by linear friction welding (LFW). This is a process whereby one part is held stationary while the other part is oscillated against it under a forge load, the heat generated and the applied loads result in a weld, as upset material exudes as flash from the edges of the joint. In the repair of blisks, the replacement blade is generally oscillated relative to the disc, while the forge load is applied in the radial direction on the blade towards the disc or on the disc towards the blade. The blade is thereby joined to the disc.

In view of the nature of their applications, blisks are susceptible to damage that in some circumstances may require the replacement of a blade. In order to replace the blade, it can be removed by machining it off to leave a repair stub, and welding a new blade onto the repair stub by LFW.

LFW results in the consumption of material (which leaves the edges of the weld as flash) and in the recirculation of contaminants back towards the weld during the process. Consequently, a large surface area is required to allow a good quality weld to be formed. This results in a necessity to machine off significant amounts of material around the weld. US 2005/0274010 (hereby incorporated by reference) proposes a collar which provides support for the stub during the friction welding process.

The majority of defects within the LFW process occur at the leading and trailing edge of the blade. Further it is difficult to perform non-destructive evaluation of blisk LFW welds. Accordingly when forming an original blisk it is usual to provide a "clean-up region" which is machined off and does not form part of the final blade. The shape of the original stub follows strict validated guidelines which ensures that the flow of material from the weld behaves similar to previous experience and provides a statistical confidence that no defect is present in the weld after machining to remove excess material.

SUMMARY OF THE INVENTION

The present disclosure may comprise one or more of the following features and combinations thereof.

A problem arises, however, in that when repairing a blisk by replacement of a damaged blade, the repair stub is generally smaller in size than the original stub and also has a different shape. It can thus be difficult to ensure that a sufficiently large surface area is available to ensure good repair weld quality. The problem can be particularly acute at the trailing and leading edges of the blade where the majority of LFW defects occur.

Accordingly, the present invention provides a method of replacing a damaged blade of an integrally bladed rotor assembly including a disc and a plurality of blades extending outwardly from a rim of the disc, the method including the steps of:

removing the damaged blade to leave a blade repair stub projecting from the rim;

locating sacrificial supports at the underside of the rim beneath the repair stub, the supports projecting axially beyond the trailing and leading edges of the rim;

depositing metal around the trailing and leading edges of the repair stub, the deposited metal, supported by the sacrificial supports, projecting axially beyond the trailing and leading edges of the rim;

attaching a replacement blade to the repair stub by linear friction welding; and removing excess deposited metal, upset metal from the linear friction welding, and the sacrificial supports Thus the sacrificial supports allow metal to be provided at the leading and trailing edges of the repair stub, where it can form a "clean-up region" which is subsequently removed and does not form part of the final repaired blade. In this way, a defect free weld can be formed. Also, the sacrificial supports can be used to react radial forge loads and oscillation loads during LFW.

In addition, relative to the approach of US 2005/0274010, the method allows the repair weld to be formed closer to the rim.

Optional features of the invention will now be set out. These are applicable singly or in any combination with any aspect of the invention.

The metal may be deposited around the entire perimeter of the repair stub. Thus although the flanks of the stub are generally not as susceptible to LFW defects as the trailing and leading edges, they also can benefit from an increased surface area during welding.

The metal may be deposited by shaped metal deposition, plasma welding, laser powder welding or laser wire welding.

The removing step is typically performed by a machining process.

The method may further include the steps of: providing a shape of an original stub at which the damaged blade was originally linear friction welded to the disc; and between the depositing and attaching steps, machining the deposited metal such that the repair stub and remaining deposited metal match the shape of the original stub. By matching the shape of the original stub, the repair can follow the original weld validation guidelines, enhancing confidence that no defect is present in the weld after removal of the excess metal etc.

The deposited metal may be the same metal as the metal of the disc. For example, the metal may be a titanium alloy such as Ti—6Al—4V, nickel alloy or steel. The sacrificial supports can also be formed from the same metal as the disc, but another option is to form them from a softer material than metal of the disc. This helps to prevent damage to the underside of the rim during LFW. For example, in the case of a disc formed from Ti—6Al—4V alloy, the sacrificial supports can be formed of commercially pure titanium.

The method may further include, before the depositing step, the step of: providing layers of relatively soft material between the sacrificial supports and the underside of the rim. These layers can also help to prevent damage to the underside of the rim during LFW. The use of such layers can be particularly beneficial if the sacrificial supports are formed from the same metal as the disc. For example, the layers can be formed of commercially pure titanium in the case of a Ti—6Al—4V disc or other softer than disc materials for alternative disc materials.

The depositing step may include depositing circumferentially extending lines of metal along the trailing and leading edges of the rim adjacent the trailing and leading edges of the repair stub and supported by the sacrificial supports. The trailing and leading edges of the rim can be relatively thin, and therefore susceptible to damage during LFW at the interfaces between the edges and the sacrificial supports. By building up these edges with the lines of metal, the interface between the edges and the sacrificial supports, and thus any such damage, can be moved away from the original positions of the edges. The original shape of the rim can then be reinstated after LFW, e.g. by suitable machining. The lines of metal can form local axial projections from the rim at its trailing and leading edges.

The attaching step may include locating tooling at the sacrificial supports to support the rim against an LFW radial forge load. Such tooling can also support the rim against an LFW oscillation load, e.g. an axial oscillation load.

These and other features of the present disclosure will become more apparent from the following description of the illustrative embodiments.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
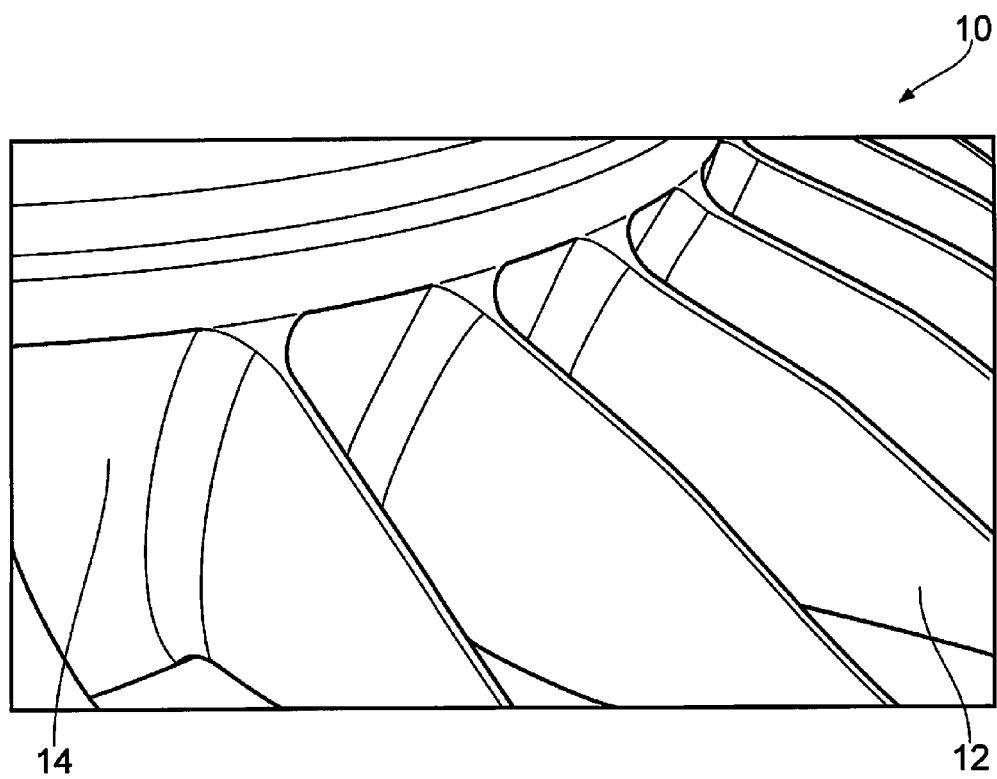
FIG. 1 is a perspective view of part of an integrally bladed rotor assembly.

For the purposes of promoting an understanding of the principles of the disclosure, reference will now be made to a number of illustrative embodiments illustrated in the drawings and specific language will be used to describe the same.

Referring to FIG. 1, there is illustrated a part of an integrally bladed rotor assembly 10 which may be used in the compressor or turbine of an aero engine. The rotor assembly 10 includes a plurality of blades 12 attached to a rim 14 of a disc so as to extend radially outwardly therefrom. The blades 12 are typically of a titanium, nickel or steel alloy (a titanium 6-4 alloy commonly being used) and are attached to the rim 14 by LFW. This can involve holding the disc stationary while a blade member (comprising the as yet un-machined/unfinished blade) is oscillated against the rim 14 under a radial forge load. For example, the blade member may be oscillated axially against the rim. The heat generated by the oscillation together with the radial load results in the material of the blade member and rim becoming viscoplastic. When the material subsequently cools, bonds are formed and a weld is created between the rim 14 and the blade 12. During the friction welding process, upset material ("flash") is extruded from the sides of the joint. The blade is subsequently machined into shape, the material at the edges of the weld being removed.

During the life of the rotor assembly 10, it is not uncommon for a single blade to become significantly damaged and to require replacement. To replace the blade, a new blade has to be attached using LFW. The damaged blade is removed so as to leave a repair stub projecting from the rim 14. A new blade may be welded onto the repair stub.

The flash extruded during this process must be controlled to ensure it flows smoothly out from the weld without any recirculation back into the weld. Preventing such recirculation avoids poor microstructure being formed in the weld. It is also necessary to remove any edge defects that are produced during the welding process. Consequently, a large surface area is required to allow a good weld to be formed.

Figure 2:
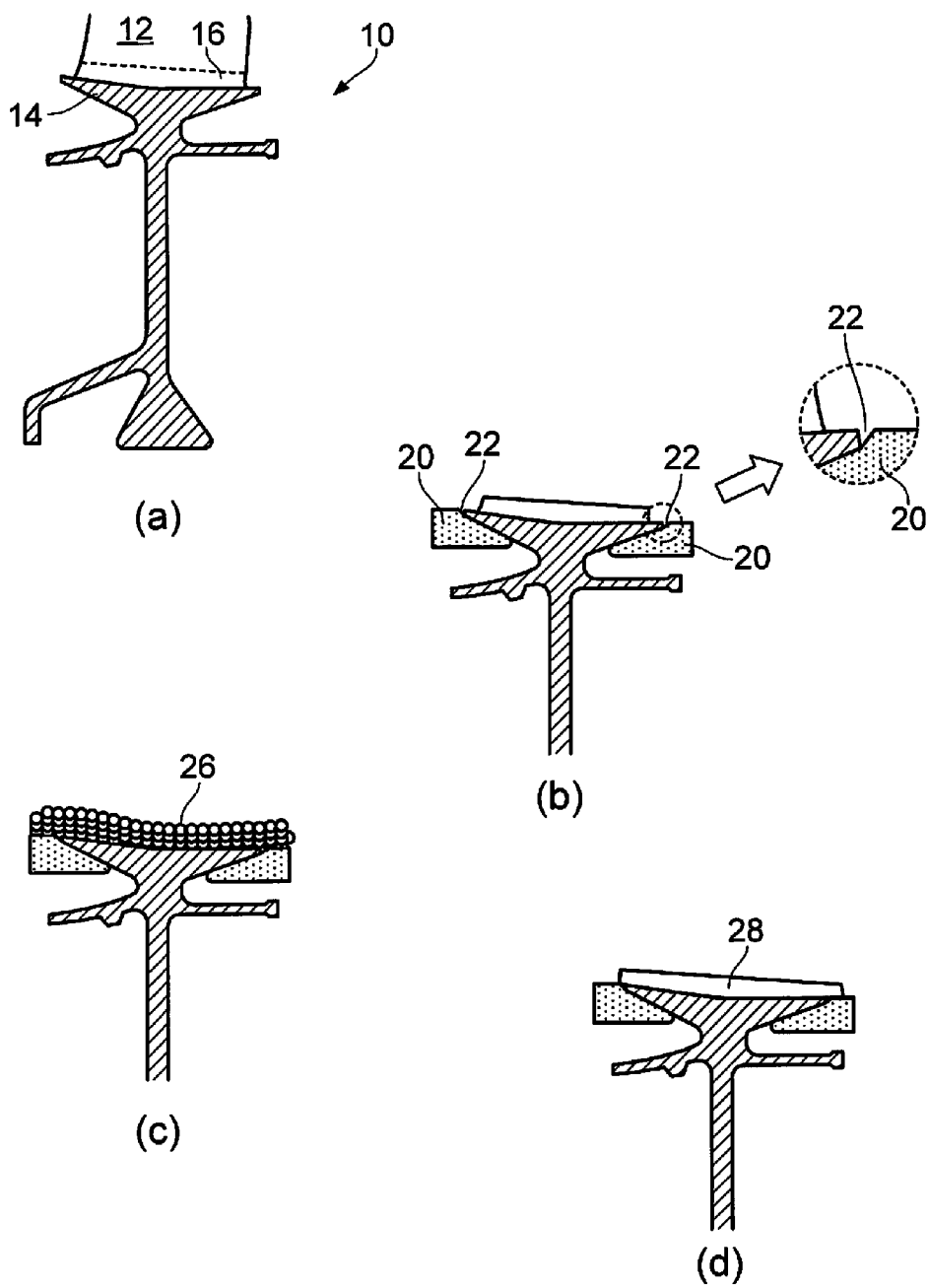
FIG. 2 shows schematically cross-sections through a bladed rotor assembly to illustrate stages (a)-(d) in a process for preparing the assembly for replacement of a damaged blade by LFW.

FIG. 2 shows schematically cross-sections through a bladed rotor assembly to illustrate stages (a)-(d) in a process for preparing the assembly for replacement of a damaged blade by LFW.

Firstly, as shown in FIG. 2(a) a damaged blade 12 is removed at the position indicated by the dotted line, leaving a repair stub 16 having an aerofoil profile.

Sacrificial supports 20 are then inserted beneath the underside of the rim at the repair stub (FIG. 2(b)). The sacrificial supports are typically formed of a material that is softer than the metal of the assembly 10 to cushion the interface between the supports and the rim, and thereby prevent damage to the underside of the rim during LFW. For example, the supports can be formed of commercially pure titanium in the case of an assembly formed of formed from Ti—6Al—4V alloy. Another option, however, is to introduce soft layers between the rim and the supports.

The supports 20 project axially beyond the trailing and leading edges of the rim 14, and are typically shaped so that they form recesses 22 which extend along the trailing and leading edges of the rim adjacent the repair stub 16 (as shown in more detail in the close up view of the circled region of the trailing edge of the rim in FIG. 2(b)). Another option, however, is to shape the supports so that they do not form such recesses and e.g. simply abut the trailing and leading edges of the rim.

Next, as shown in FIG. 2(c), metal is deposited around the repair stub 16, for example by shaped metal deposition, plasma welding, laser powder welding or laser wire welding. In particular, the deposited metal 26, supported by the sacrificial supports 20, wraps around the trailing and leading edges of the stub and projects axially beyond the trailing and leading edges of the rim 14. Circumferentially extending lines of deposited metal also fill the recesses 22 (if present)

formed by the sacrificial supports at the trailing and leading edges of the rim. Typically, the deposited metal is the same as the metal of the assembly 10.

Figure 3:
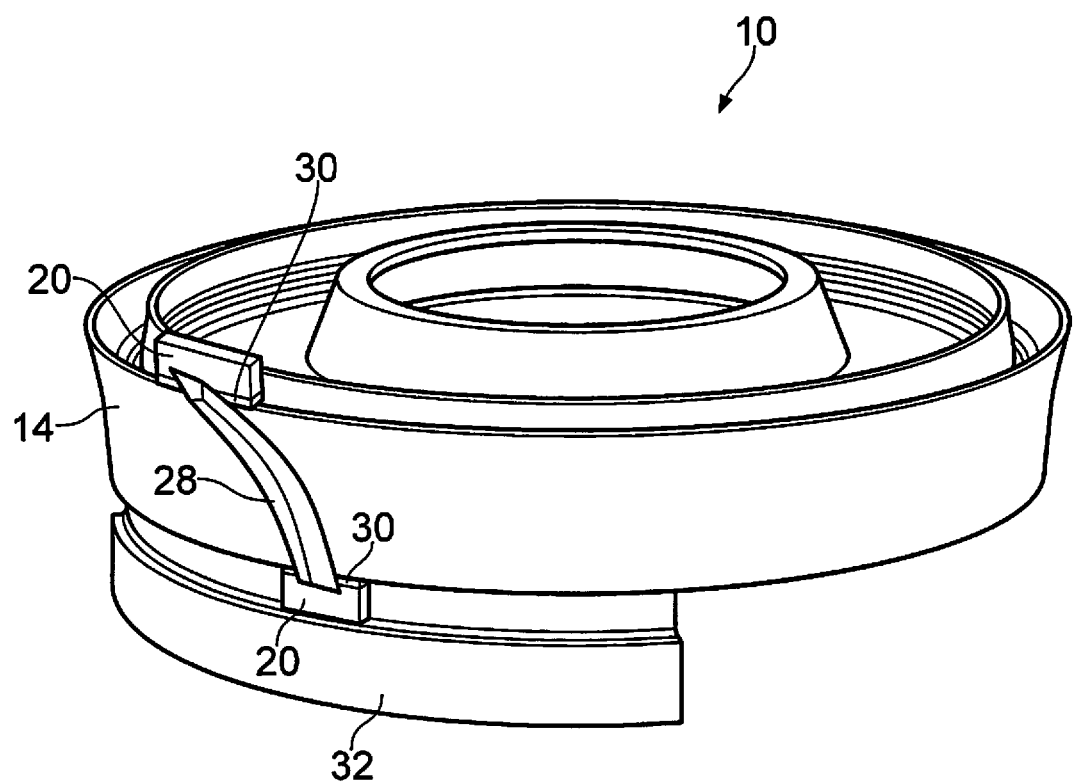
FIG. 3 shows schematically a perspective view of the assembly of FIG. 2(d).

Finally, as shown in FIG. 2(d), and in FIG. 3 which shows schematically a perspective view of the assembly 10, the deposited metal 26 is machined to form an enlarged repair stub 28. For clarity in FIG. 3, none of the other blades of the assembly are shown.

As a result of the machining process, the enlarged stub 28 is shaped to correspond to the shape of the original stub at which the damaged blade 12 was originally linear friction welded to the assembly 10. Thus, relative to the repair stub 16 immediately post-removal of the damaged blade, the enlarged stub has an increased axial length such that it overhangs the trailing and leading edges of the rim 14, and its thickness in the circumferential direction can be increased. Further, the metal deposited in the circumferentially extending recesses 22 forms local axial projections 30 from the rim at both its trailing and leading edges.

Also shown in FIG. 3 is a tooling 32 which locates beneath one of the sacrificial supports 20. Although not shown, a similar tooling is located on the other side of the assembly 10 beneath the other sacrificial support. The tooling reacts the radial forge load and an axial oscillation load during LFW. Further tooling can be applied at a radially inward portion of the assembly to provide an axial clamp for in-plane load reaction.

A new blade is then joined to the enlarged stub 28 by LFW. Thereafter, a further machining process removes the sacrificial supports 20, excess deposited metal (including the axial projections 30), and upset metal from the welding process to recreate the configuration of the original blade and rim.

Advantageously, the process enables the recreation of a stub 28 which matches the shape of the original stub used to join the damaged blade 12 to the assembly 10. In particular, the majority of defects within the LFW process occur at the leading and trailing edge of the stub within the "clean-up region" which is machined off and does not form part of the final blade. The original stub configuration follows strict validated guidelines which ensure that, to a given level of statistical confidence, the flow of material from the weld avoids defects being formed in the blade. By matching that configuration in the blade replacement process, it can be ensured to a similar level of confidence that no defects will be formed in the replacement blade.

In addition, the local axial projections 30 from the rim 14 formed from the metal deposited in the circumferentially extending recesses 22, moves the end interfaces to the sacrificial supports 20 axially away from the actual material of the rim. Any damage caused by the supports during the LFW process at the leading and trailing edges of the rim is thus axially displaced from the rim proper into the local axial projections, which are subsequently machined off to recreate the original rim after the LFW process.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

LIST OF FEATURES

Integrally bladed rotor assembly 10
Blades 12
Rim 14
Repair stub 16
Sacrificial supports 20
Recesses 26
Enlarged repair stub 28
Axial rim projections 30
Tooling 32

What is claimed is:

1. A method of replacing a damaged blade of an integrally bladed rotor assembly including a disc and a plurality of blades extending outwardly from a rim of the disc, the method including the steps of:
   removing the damaged blade to leave a blade repair stub projecting from the rim;
   locating sacrificial supports at the underside of the rim beneath the repair stub, the supports projecting axially beyond the trailing and leading edges of the rim;
   depositing metal around the trailing and leading edges of the repair stub, the deposited metal, supported by the sacrificial supports, projecting axially beyond the trailing and leading edges of the rim;
   attaching a replacement blade to the repair stub by linear friction welding; and
   removing excess deposited metal, upset metal from the linear friction welding, and the sacrificial supports.

2. The method according to claim 1, wherein the metal is deposited around the entire perimeter of the repair stub.

3. The method according to claim 1, wherein the metal is deposited by shaped metal deposition, plasma welding, laser powder welding or laser wire welding.

4. The method of claim 1 further including the steps of:
   providing a shape of an original stub at which the damaged blade was originally linear friction welded to the disc; and
   between the depositing and attaching steps, machining the deposited metal such that the repair stub and remaining deposited metal match the shape of the original stub.

5. The method of claim 1, wherein the deposited metal is the same metal as the metal of the disc.

6. The method of claim 1, wherein the sacrificial supports are formed from a softer material than metal of the disc.

7. The method of claim 1, wherein the depositing step includes depositing circumferentially extending lines of metal along the trailing and leading edges of the rim adjacent the trailing and leading edges of the repair stub to form local axial projections from the rim supported by the sacrificial supports.

8. The method according to claim 7 further including, after the attaching step, the step of:
   removing the local axial projections to reinstate the trailing and leading edges of the rim adjacent the trailing and leading edges of the repair stub.

9. The method of claim 1, wherein the attaching step includes locating tooling (32) at the sacrificial supports to support the rim against a linear friction welding radial forge load.

10. The method according to claim 9, wherein the tooling also supports the rim against a linear friction welding oscillation load.

* * * * *